(12) United States Patent
Maxson

(10) Patent No.: US 7,312,836 B2
(45) Date of Patent: Dec. 25, 2007

(54) TELEVISION DISPLAY COVER

(76) Inventor: Peter H. Maxson, 8 Hudson, Irvine, CA (US) 92620

( * ) Notice: Subject to any disclaimer, the term of this patent is extended or adjusted under 35 U.S.C. 154(b) by 370 days.

(21) Appl. No.: 10/772,059

(22) Filed: Feb. 3, 2004

(65) Prior Publication Data

US 2005/0168661 A1    Aug. 4, 2005

(51) Int. Cl.
*H04N 7/18* (2006.01)
(52) U.S. Cl. .................... 348/825; 348/818
(58) Field of Classification Search ........ 348/800–900
See application file for complete search history.

(56) References Cited

U.S. PATENT DOCUMENTS

| | | | | |
|---|---|---|---|---|
| 5,138,462 A | * | 8/1992 | Skovgaard | 348/836 |
| 5,264,765 A | * | 11/1993 | Pecorino et al. | 318/265 |
| 5,343,257 A | * | 8/1994 | Kohno et al. | 348/842 |
| 5,410,373 A | * | 4/1995 | Sagues et al. | 348/825 |
| 6,846,083 B1 | * | 1/2005 | Mylar | 359/612 |
| 6,966,617 B2 | * | 11/2005 | Chen et al. | 312/7.2 |
| 2001/0043290 A1 | * | 11/2001 | Yamamoto | 348/836 |

OTHER PUBLICATIONS

Merriam Webster's Collegiate Dictionary, Tenth Edition, Copyright 1997 by Merriam-Webster, Incorporated, p. 1009.*

* cited by examiner

*Primary Examiner*—Anand Rao
(74) *Attorney, Agent, or Firm*—Niky Economy Syrengelas, Esq.; Crockett & Crockett

(57) ABSTRACT

A television display cover for covering the screen of a plasma or LCD screen when the television is not in use. The cover can be converted from existing frames, framed art, or mirrors already contained in a users' home or wall or panel for attachment of the display cover. Support brackets are secured to a wall or recessed surface. The support brackets are secured to the display cover via some attachment means. The cover can then be pivoted to an open or closed position to either expose the television display or cover it up.

12 Claims, 2 Drawing Sheets

TELEVISION DISPLAY COVER

FIELD OF THE INVENTIONS

The inventions described below relate to the field of television screen covers as they apply particularly to plasma screen and flat screen television covers.

BACKGROUND OF THE INVENTIONS

Plasma televisions have been popularized as an alternative to tube televisions. The flat panel displays appeal to consumers for their visual distinction as well as non-conventional display options. The plasma technology allows for televisions to be dimensioned in shapes not traditionally available. Unlike conventional televisions, plasma screen televisions can be mounted onto any one of several structures, including walls. The framework is much more lightweight and the total thickness of the plasma televisions are much more slender than the conventional television sets. The configuration affords the owner the option of hanging the plasma television from a wall within a selected room or in a bookcase. The drawback of hanging the plasma television from a wall is that the television then becomes the focal point of any room within which it is contained. This creates a problem in discretely trying to camouflage or hide large plasma or LCD screens from display when they are turned off or not being viewed.

While some plasma screen covering devices currently exist in the marketplace, these devices are tremendously expensive. When the price of a covering is added to the cost of the plasma television itself, this can raise the overall cost an exorbitant amount. Additionally, these coverings require the user to select a new covering rather than allowing the covering to be used with their existing framed art or mirror. This dictates the form that the art may be in that it is generally only printed on pliable canvas thereby limiting a person purchasing new art to the form of thinly applied ink or paint on a canvas. Additionally, the frame cannot be hidden and it is always in view. This limits the option to present a theater type presentation in a traditional Gilded ornate frame. Further, the art may not be easily changed out for seasonal preferences. Additionally, the prior covers cannot be utilized within cabinets or book cases, only on walls. Finally, the prior covers require that they be in the exact size of the television screen itself. These limitations have been overcome by the new device described below.

SUMMARY

The device described below provides for easy, efficient, and economical concealment of a plasma or LCD screen when the television is not in use. The cover can be converted from existing frames, framed art, or mirrors already contained in a user's home. The cover can be used with wall or cabinet mounted televisions. The wall mounted televisions may further include those mounted directly onto the face of a wall or alternatively within a recessed cutout into a wall.

With a wall mounted configuration, two side support brackets are mounted directly onto a wall. The support brackets assist in distributing the load of the television display device. The device may be of a weight that exceeds the capacity of the drywall contained within the wall to support it. The supports therefore solve this problem by distributing the weight of the television throughout the span of the support brackets. The support brackets are mounted at a distance from each other such that a plasma television may be mounted onto the wall between the support brackets. A television screen display cover is positioned over the support brackets. The display cover is secured at its extreme ends to the support brackets by use of a spring or other suitable device. Other suitable devices includes dampers, linear actuators, electric cylinders, lid holder uppers, or any combination therefore. Gas springs are also commonly used to achieve this function. The spring is secured to the display cover at one end and the support bracket at the other end.

In an engaged position, the display cover conceals the television screen secured beneath it. The display cover can be decorated by an artistic depiction on its exposed surface when the display is in the engaged position. Alternatively, the display cover can be a mirror, white board, or other ornate depiction. The user simply applies a slight amount of pressure to the end of the display cover to activate the gas springs and pivot the display cover to an open or non-engaged position. The force applied releases the display cover so that it retracts and locks into a position approximately 90 degrees with the wall on which the television is mounted. This allows the television display panel to be visible for viewing of the television by an audience.

Alternatively in a configuration where the television is mounted within a cabinet, a recessed portion of the wall, or an enclosure created by the framing of the artwork, the support brackets are configured to be affixed within the recessed area. The recessed area may be within a cabinet or alternatively within a recessed portion of a wall cutout specifically to the dimensions of the plasma television. The cut out may be dimensioned to cut away only at the drywall layer of the wall or may alternatively be cut at a greater depth to cut away so that the television may be mounted directly into the studs contained within the walls. The support brackets are mounted within the recessed portion and the television is secured between the support brackets. The television screen cover is positioned over the support brackets. The display cover is secured to the support brackets by use of a gas spring or other suitable device. The gas spring is secured to the display cover at one end and the support bracket at the other end. The engaged and non-engaged position function as described above.

The display cover may be a mirror, a two-way mirror, or a framed or non-framed piece of art. Additionally, the display cover may be a paneling or other substrate to which any other desired cover item could be fastened or adhered to. For example, a white board may be attached to the paneling and sever as a cover for rooms such as conference rooms. The piece of art may be an oil painting, a Giclee print, or poster art that is desired by the user to be displayed when the television is not is use. The display cover may be something that the user previously had in their home, or may be a novel selection for concealment. Determination of the exact configuration and spacing of the springs may be determined by input of certain criteria. The size and weight of the television display cover are input and the location of the springs are calculated prior to installation.

DETAILED DESCRIPTION OF THE INVENTIONS

Figure 1A:
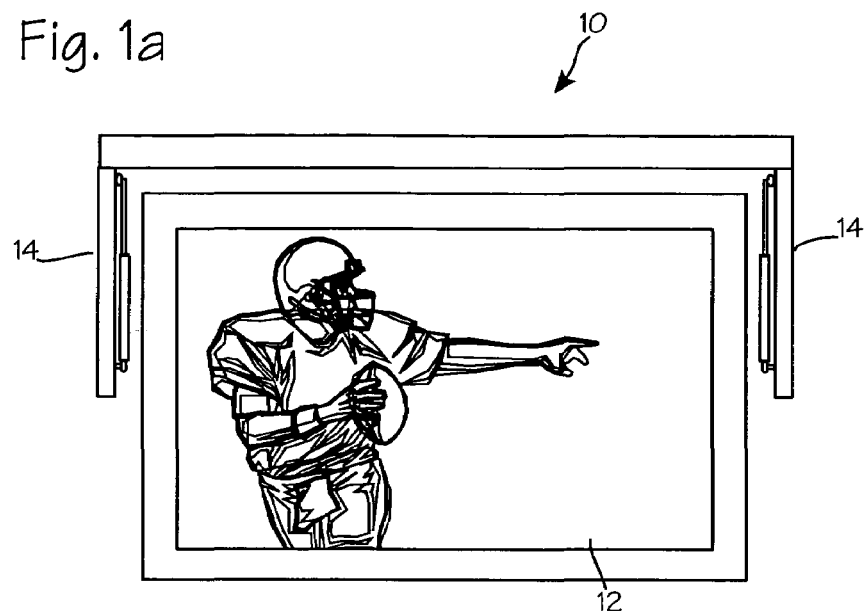
FIG. 1a is a view of a wall mounted television display cover in a non-engaged or extended position.

FIG. 1a is a view of a wall mounted television display cover in a non-engaged or extended position. The television screen cover 10 is in an extended position and the television display screen 12 is visible. The television screen cover comprises a rigid planar panel, support brackets, and the associated hardware. The television is mounted to a wall such that the television projects from the wall at some distance. Support brackets 14 are mounted onto the wall and the mounted television is positioned between the two support brackets 14. The support brackets are comprised of a front and back face as well as two oppositely positioned edges. One of the side edges of each support bracket is secured to the wall. The brackets can appropriately support the weight of the television display cover 10 and provide additional support in distributing the weight of the television cover. The support brackets 14 can be constructed of any material that can appropriately support the weight of the cover including wood, metal, aluminum, plastic, or other substrates. Alternatively, the bracket may be comprised of a durable material that is then covered with paneling or other disguising material (not shown). The paneling may be comprised of any material the user desires in order to be camouflaged. The paneling may also comprise a boxed enclosure for containing the support brackets when a more enclosed structure is preferred. The display cover 10 is comprised of a front face, back face, and two side edges. The two side edges of the display cover are secured to the front faces of the support brackets 14 by a spring or other suitable device 16. Optionally, a hinge may be positioned on the side edges or the top edge of the support bracket to provide for pivoting of the cover.

Typical types of devices that may be utilized for the spring include most gas springs, mechanical springs, electrical or automated springs, dampers, chains, linear actuators, electric cylinder, or other tracks rotating a cam, or any combination thereof. The spring assists in pivoting the television screen cover with a minimal amount of force into either the engaged or non-engaged position. Typically, the spring will be mounted in an orientation where the shaft of the spring is pointing down. The spring can be set to have a controlled rate of extension that can be set to a prescribed velocity. The advantage to use of the gas springs is that they require only a minimal amount of initial force to engage them. By way of example, where a 25 pound display cover with a gas spring hinge with a maximum force of 130 pounds is utilized, the force for lifting the display screen cover would be 3.70 pounds and the force for lowering it would be 1.35 pounds. This minimal amount of force required to activate the pivot action of the display cover can be simply performed by most users.

Figure 1B:
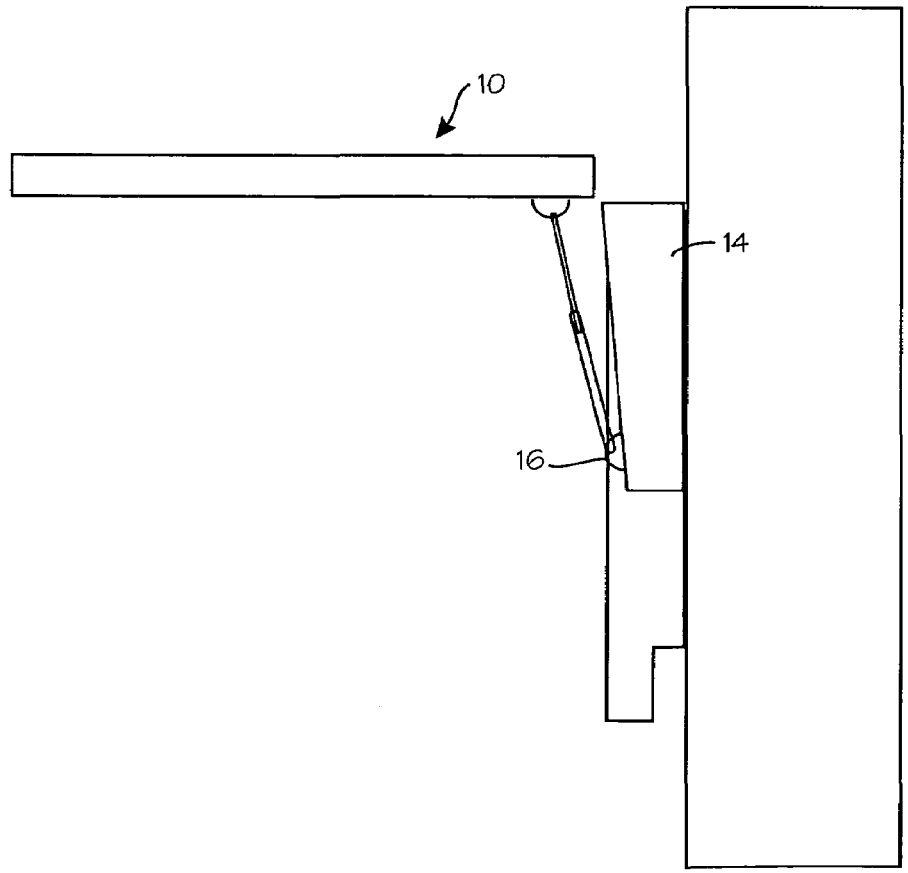
FIG. 1b is a side view of a wall mounted television display cover in a non-engaged or extended position.

FIG. 1b is a side view of a wall mounted television display cover in a non-engaged or exyended position. This Figure illustrates the configuration of the spring 16 in relation to the support bracket 14. The spring is connected at one end to the display cover and at the other end to the support bracket. A hinge may be connected to the side of the support bracket to provide for pivoting of the display cover. Alternatively, the hinge may be positioned on top of the support bracket.

Figure 2:
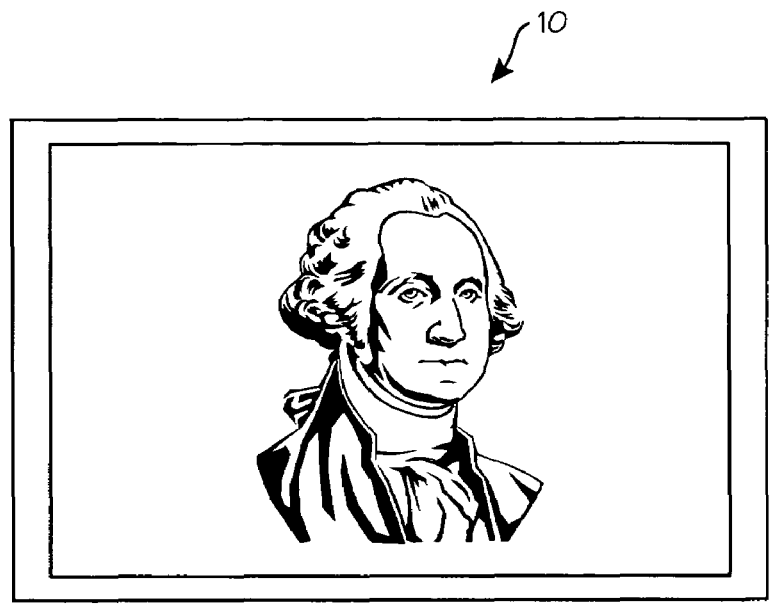
FIG. 2 is a view of a television display cover in an engaged position.

FIG. 2 is a view of a television display cover in an engaged or retracted position. The television screen cover 10 has a front face and a back face. The front face may be comprised of any one of several different graphic depictions. Alternatively, the front face may be comprised of either a one-way or two-way mirror, or any other frame or substrate with which it is capable to fasten or adhere art frame or other desired article. This may include white boards or other decorative or stylish displays. The front face cover is selected according to the preference of the user. The front face conceals the television monitor when the television is not in use. Therefore, the front face composition is selected according to what feature (either an artistic depiction, mirror or panel) the user would like to have displayed when the television is not in use.

Figure 3:
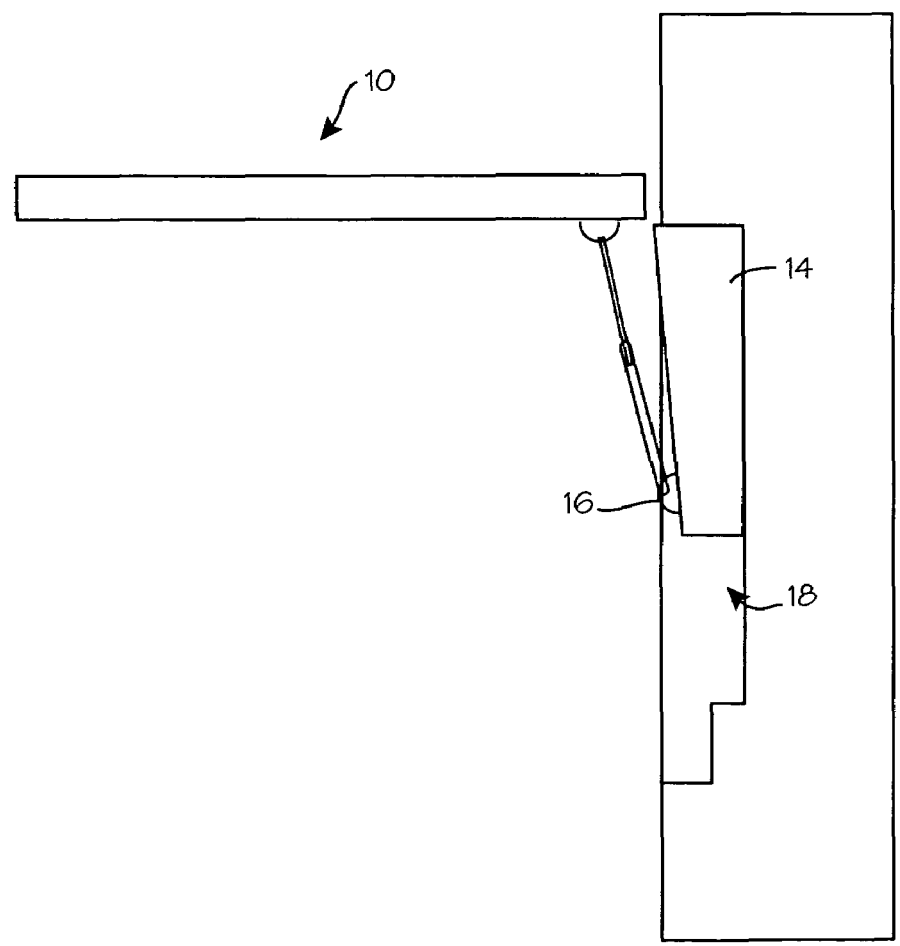
FIG. 3 is a view of a television display cover over a television mounted within a recessed cavity in a non-engaged or extended position.

FIG. 3 is a view of a television display cover 10 over a television mounted within a recessed cavity in a non-engaged or extended position. When the television is not mounted directly onto a wall, it may be mounted either into a cabinet or alternatively into a recessed cavity cut out of the wall 18. These alternative mounting preferences afford the user additional concealment options so that the support brackets 14 are not visible from the side of the cover. If a theater effect is desired, a portion of the wall may be cutout in order to accommodate the television set. A recessed portion is cut out and the drywall and studs contained at the portion of the wall are removed. The depth of the cutout corresponds to the depth of the television size accordingly, but an average cutout size is between 4 and 6 inches. With general plasma televisions being about 4 inches thick and the mounting devices being approximately 2 inches thick, this means that in a recessed configuration, the television can either lie flush with the recessed portion or protrude as much as 2 inches from within the wall cut out.

Headers can be created on the top and bottom portion of the cutout area. The television unit nests inside the cutout portion. The support brackets are configured to fit within the recessed portion and define a distance from the side of the recess to the support panel. This distance accommodates for positioning of a spring to connect the support bracket to the display cover. While the television is contained within a recess, the function of the display cover is identical to that described above.

Alternatively, a frame enclosure may be positioned within the recessed portion to provide the entire foundational support for the television. If the cutout into the wall is deep enough, the entire support bracket may be positioned within the frame enclosure so that the television and associated mounting elements are contained entirely inside the frame enclosure. With this configuration, the television and mounting elements sit entirely inside the frame enclosure such that the television display cover lies flush with the wall. The frame enclosure provides the entire foundational support of the television itself and the associated mounting elements.

Identically, if the television is contained within a cabinet, the function is the same, but the support brackets are positioned inside the cabinet. This allows the brackets to be hidden from view within the cabinet.

If a theater environment is preferred, side paneling may be provided (not shown). This side paneling may be comprised of fiberglass or any other molded or fabricated material and may be colored the same as the side frame of the television. The paneling encloses the television display so that a side view of the cover does not reveal anything but the paneling. This provides a greater amount of camouflage when the display cover is down. It also provides the feel of a theater environment when the display cover is up and the viewer is watching television.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A mountable television display concealment device capable of exposing a television display, said concealment device comprising:
   a rigid planar panel with a front face, back face, and two rigid side edges;
   at least one support bracket with a front face, back face, and two side edges wherein one of the side edges is adapted for securing on a vertical surface;
   attachment means capable of fixedly engaging the rigid side edges of the planar panel to one of the side edges of each support bracket; and
   means for pivoting the planar panel up from a first retracted position wherein the planar panel covers the television display to a second extended position wherein the display is visible for viewing;
   wherein the rigid planar panel is moveable from a first configuration and a second configuration and in the first configuration said rigid planar panel is in a vertical configuration and wherein in a second configuration said rigid planar panel is in a horizontal configuration wherein the rigid planar panel extends horizontally from the support bracket and where the front, back and sides edges of the rigid planar panel are maintained in a rigid planar configuration when the panel is moved from the vertical configuration to the horizontal configuration.

2. The device of claim 1 wherein the front face of the planar panel is comprised of a mirror.

3. The device of claim 1 wherein the front face is comprised of a piece of art.

4. The device of claim 1 wherein the front face is comprised of a white board.

5. The device of claim 1 wherein the vertical surface is a wall.

6. The device of claim 1 wherein the vertical surface is a recessed cabinet.

7. The device of claim 1 wherein the vertical surface is a recessed wall.

8. The device of claim 1 further including input means for input of weight and size data to determine location of position of attachment means.

9. The device of claim 1 wherein the attachment device is a gas spring.

10. The device of claim 1 wherein the attachment device is a linear actuator.

11. The device of claim 1 wherein the attachment device is an electric cylinder.

12. The device of claim 1 wherein the pivoting means is a hinge.

* * * * *